(12) United States Patent
Lin

(10) Patent No.: US 8,072,532 B2
(45) Date of Patent: Dec. 6, 2011

(54) CAMERA MODULE WITH SWITCHING LENSES

(75) Inventor: Tsung-Yu Lin, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 461 days.

(21) Appl. No.: 12/423,076

(22) Filed: Apr. 14, 2009

(65) Prior Publication Data

US 2010/0045850 A1 Feb. 25, 2010

(30) Foreign Application Priority Data

Aug. 19, 2008 (CN) .......................... 2008 1 0304043

(51) Int. Cl.
*H04N 5/225* (2006.01)

(52) U.S. Cl. ..................... 348/360; 396/74; 359/808

(58) Field of Classification Search .................. 348/360; 396/439, 529, 73, 74; 359/642, 808, 819
See application file for complete search history.

(56) References Cited

U.S. PATENT DOCUMENTS 6,643,457 B2 * 11/2003 Chen .............................. 396/74
7,708,481 B2 * 5/2010 Huang ........................... 396/74
* cited by examiner

*Primary Examiner* — Clayton E Laballe
*Assistant Examiner* — Autumn Parker
(74) *Attorney, Agent, or Firm* — Altis Law Group, Inc.

(57) ABSTRACT

An exemplary camera module includes a printed circuit board, an image sensor, a spacer and a lens holder. The image sensor and the spacer are both mounted on the printed circuit board. The lens holder is arranged on and is rotatable relative to the spacer. The lens holder includes spaced lens receiving through holes each receiving a lens therein. Each of the lens receiving through holes together with the at least one lens is capable of aligning with the image sensor by rotation of the lens holder.

16 Claims, 7 Drawing Sheets

CAMERA MODULE WITH SWITCHING LENSES

BACKGROUND

1. Technical Field

The disclosure relates to camera modules, and particularly, to a camera module having plural selectable lenses.

2. Description of Related Art

With ongoing developments in microcircuitry and multimedia technology, camera modules such as digital camera modules are in widespread use and are often combined with various electronic devices.

In a camera module, at least one lens and an image sensor are required. Commonly, the one or more lenses are held by a lens holder, and the image sensor is mounted to a printed circuit board. The lenses and the lens holder thereof form a lens module. The lens module is fixed in the camera module. In some cases, the lens module is removable, so that it can be replaced by another lens module having a different desired lens configuration.

If the lens module is non-removably fixed in the camera module, the camera module lacks the flexibility of optional lenses. On the other hand, if the lens module is removably fixed in the camera module, a user may need to carry a number of the lens modules together with the camera module. In such case, the portability of the camera module is compromised.

What is needed, therefore, is a camera module which can overcome the described limitations.

BRIEF DESCRIPTION OF THE DRAWINGS

Many aspects of the present camera module can be better understood with reference to the following drawings. The components in the drawings are not necessarily drawn to scale, the emphasis instead being placed upon clearly illustrating the principles of the present camera module. Moreover, in the drawings, all the views are schematic, and like reference numerals designate corresponding parts throughout the several views.

DETAILED DESCRIPTION OF EMBODIMENTS

Embodiments of the present camera module will now be described in detail below and with reference to the drawings.

Figure 1:
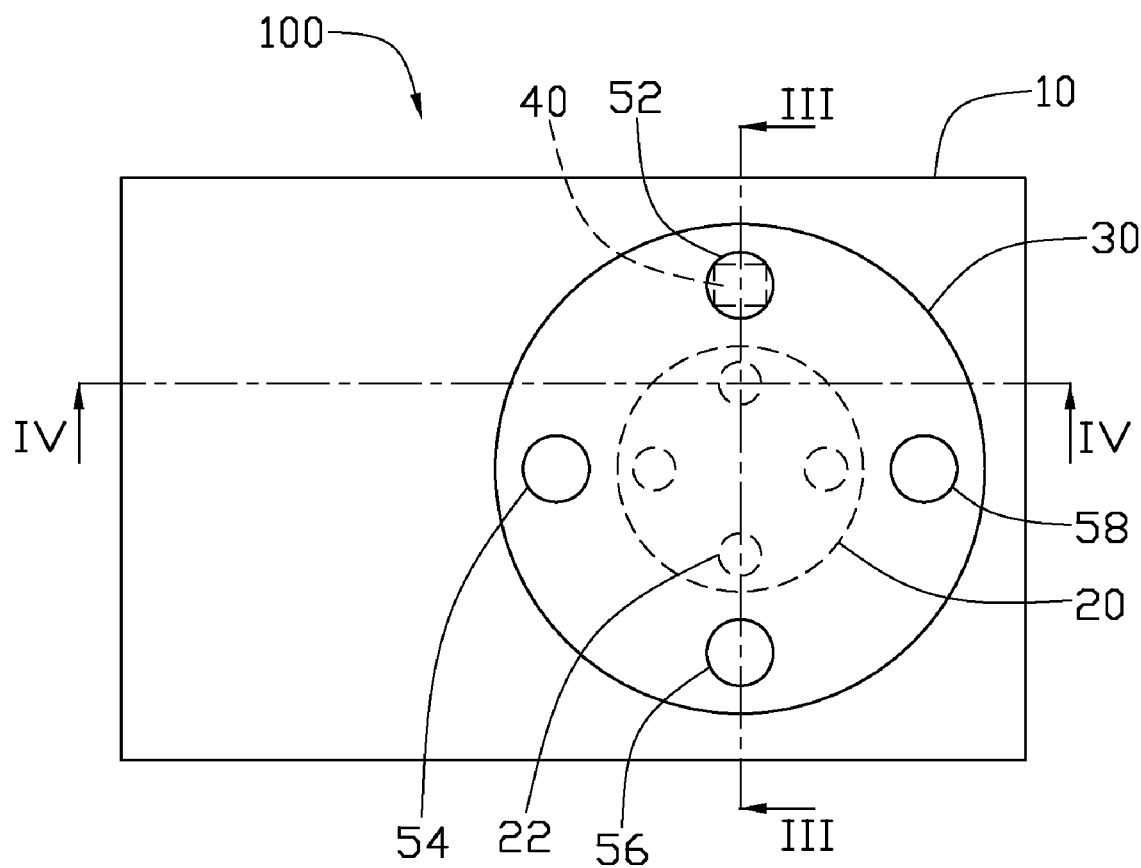
FIG. 1 is a plan view of a camera module in accordance with a first embodiment, the camera module including a lens holder and a spacer.
Figure 2:
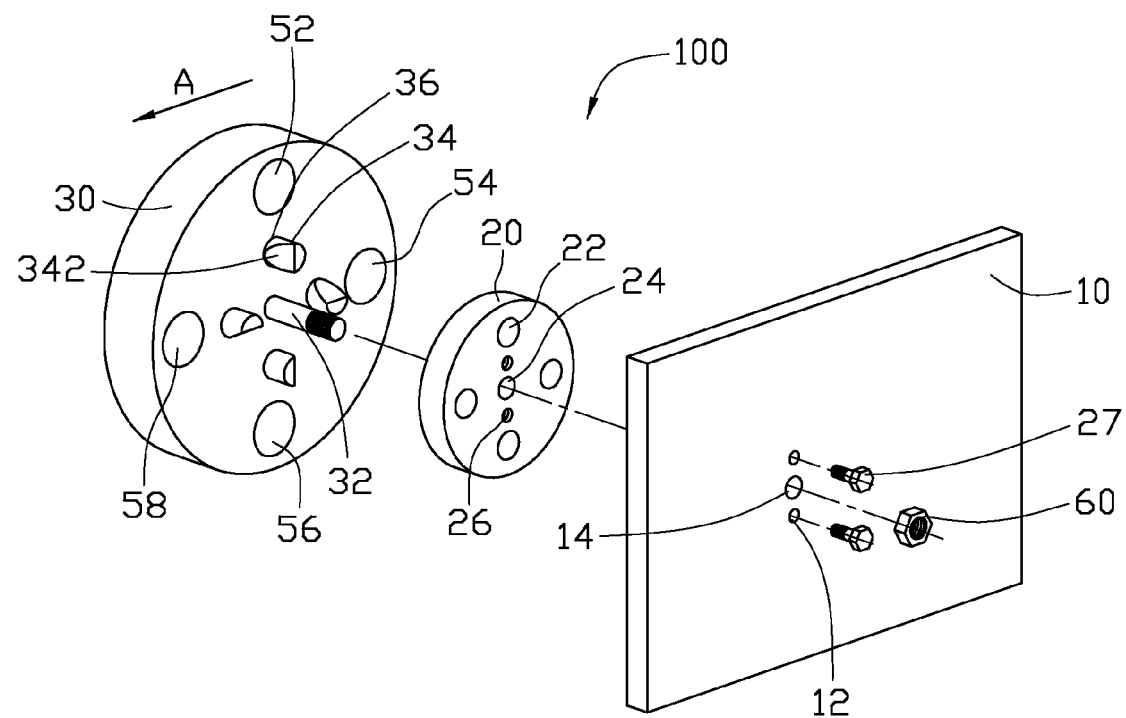
FIG. 2 is an isometric, disassembled view of the camera module of FIG. 1.
Figure 3:
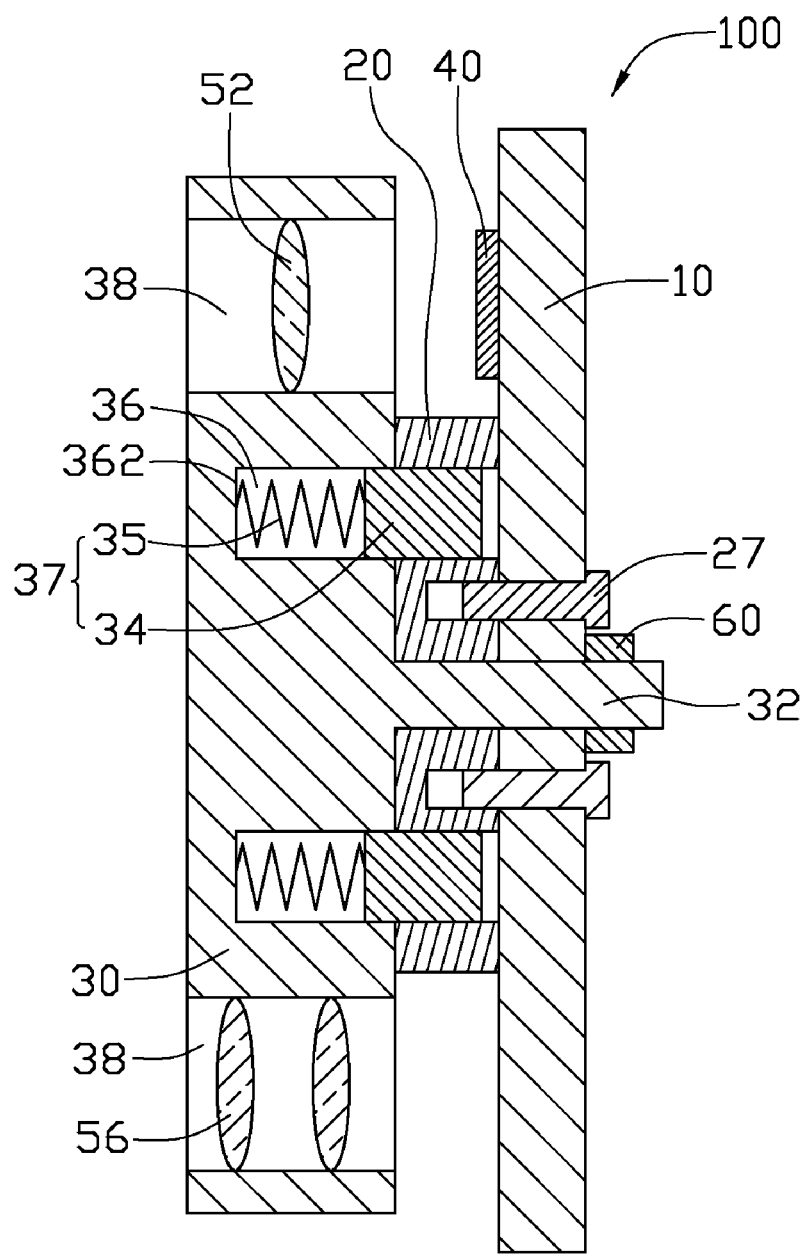
FIG. 3 is a cross-section of the camera module of FIG. 1 taken along a line III-III thereof.

Referring to FIGS. 1 to 3, an exemplary camera module 100 in accordance with a first embodiment is shown. The camera module 100 includes an image sensor 40, a printed circuit board 10, a spacer 20, and a lens holder 30. The image sensor 40 and the spacer 20 are both mounted on the printed circuit board 10. The lens holder 30 is arranged on and is rotatable relative to the spacer 20.

The lens holder 30 is disk-shaped. The lens holder 30 includes four lens receiving through holes 38 receiving lenses 52, 54, 56, 58 therein, respectively. The four lens receiving through holes 38 are arranged along an imaginary ring, and are in radial symmetry about a center of the lens holder 30. The lens holder 30 further includes four sockets 36, and a shaft 32 having one or more threads formed thereon. The four sockets 36 are arranged along an imaginary ring, and are in radial symmetry about the center of the lens holder 30. Each socket 36 can receive a resilient positioning member 37. The resilient positioning member 37 includes a spring 35 mounted to a bottom 362 of the socket 36, and a protrusion 34 connected to the spring 35. The protrusion 34 is tapered from a bottom end thereof which is adjacent to the spring 35 toward a top end thereof. In present embodiment, the protrusion 34 is a column having a bevel 342 formed thereon. The length of the bevel 324 is such that most of the protrusion 34 is tapered. The protrusion 34 is slidably received in the socket 36. The lens receiving through holes 38 are positioned adjacent outmost radial sides of the sockets 36, respectively. The shaft 32 extends perpendicularly from a center of the lens holder 30.

The printed circuit board 10 includes two first through holes 12, and a second through hole 14. The second through hole 14 is defined in a center region of the printed circuit board 10, and the two first through holes 12 are defined adjacent to opposite sides of the second through hole 14.

The spacer 20 is disk-shaped and is smaller than the lens holder 30. The spacer 20 includes a third through hole 24 defined in a center thereof, and two threaded holes 26 defined adjacent to opposite sides of the third through hole 24. The spacer 20 also includes four positioning holes 22 defined near a periphery thereof. The four positioning holes 22 are arranged along an imaginary ring, and are in radial symmetry about the center of the spacer 20.

In assembly, two fasteners 27, such as screws, and a retainer 60, such as a nut, are used. The fasteners 27 are extended through the respective first through holes 12 of the printed circuit board 10 and engaged in the respective threaded holes 26 of the spacer 20. In this way, the spacer 20 is stably mounted to the printed circuit board 10. The shaft 32 of the lens holder 30 is extended through the third through hole 24 of the spacer 20 and the second through hole 14 of the printed circuit board 10, and engaged with the retainer 60. In this way, the lens holder 30 is arranged on the spacer 20, and is rotatable relative to the spacer 20 and the printed circuit board 10.

Figure 4:
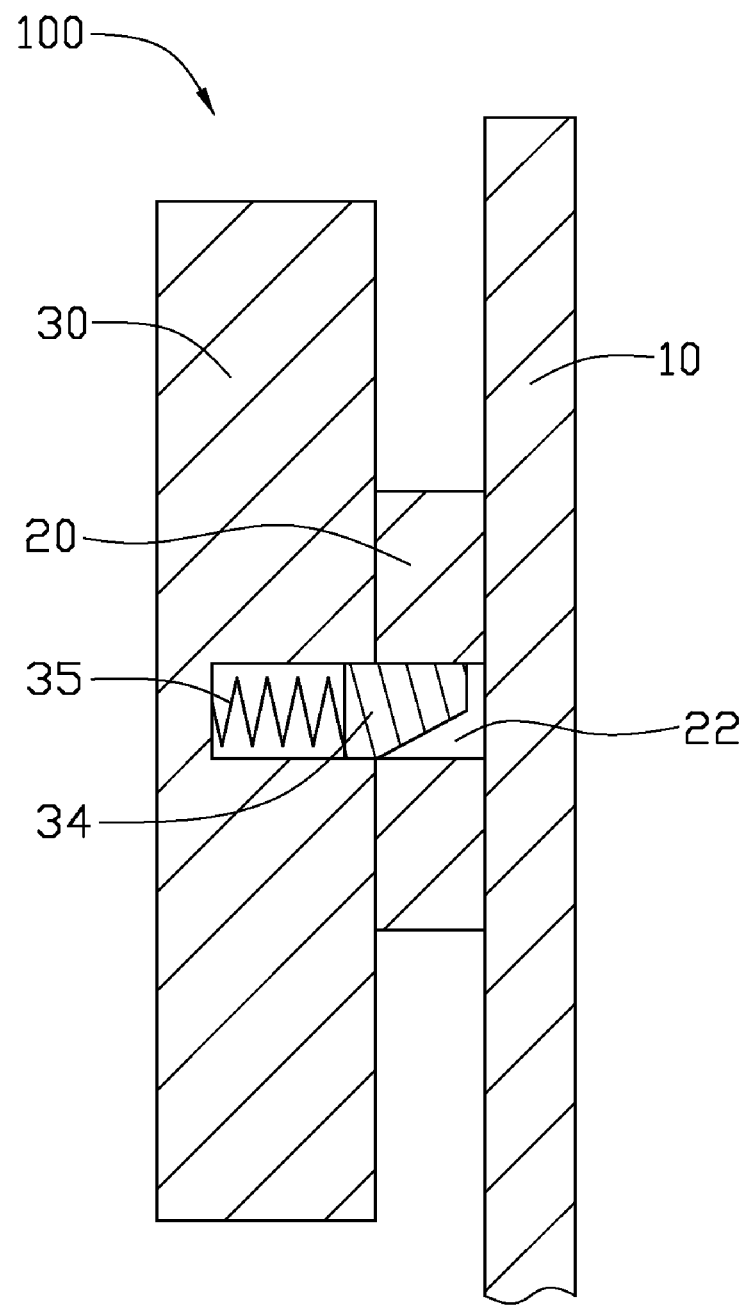
FIG. 4 is a partial cross-section of the camera module of FIG. 1 taken along a line IV-IV thereof, showing a protrusion of the lens holder received in a positioning hole of the spacer.

Referring also to FIG. 4, the protrusions 34 of the resilient positioning members 37 can removably engage in the positioning holes 22 of the spacer 20. In this state, the springs 35 are uncompressed. In this way, the lens holder 30 is fixed in position on the spacer 20, albeit movable from such position by application of an external force. In any one of four such fixed positions, a respective one of the lenses 52, 54, 56, 58 is aligned with the image sensor 40.

Figure 5:
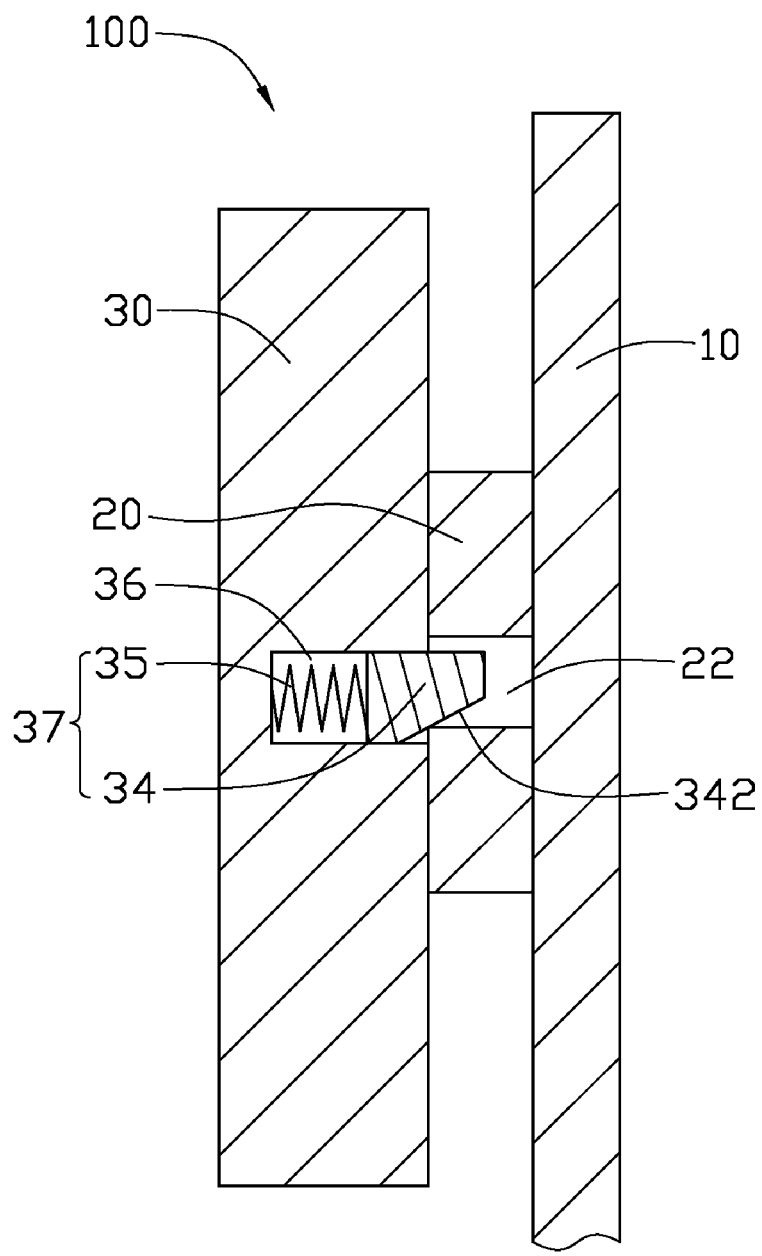
FIG. 5 is similar to FIG. 4, but showing the protrusion being withdrawn from the positioning hole by rotation of the lens holder.

Referring also to FIG. 5, a user can apply rotational force on the lens holder 30. Due to the bevel 342 of each protrusion 34, with rotation of the lens holder 30 in direction A as shown in FIG. 2, the lens holder 30 can drive the protrusions 34 of the resilient positioning members 37 to gradually exit the positioning holes 22 and fully enter the sockets 36. In this state, the springs 35 are compressed. When the lens holder 30 has been rotated 90°, the protrusions 34 of the resilient positioning members 37 again removably engage in the positioning holes 22 of the spacer 20. Thus, another one of lenses 52, 54, 56, 58 is aligned with the image sensor 40. In this way, any of the lenses 52, 54, 56, 58 can selectively be aligned with the image sensor 40.

Figure 6:
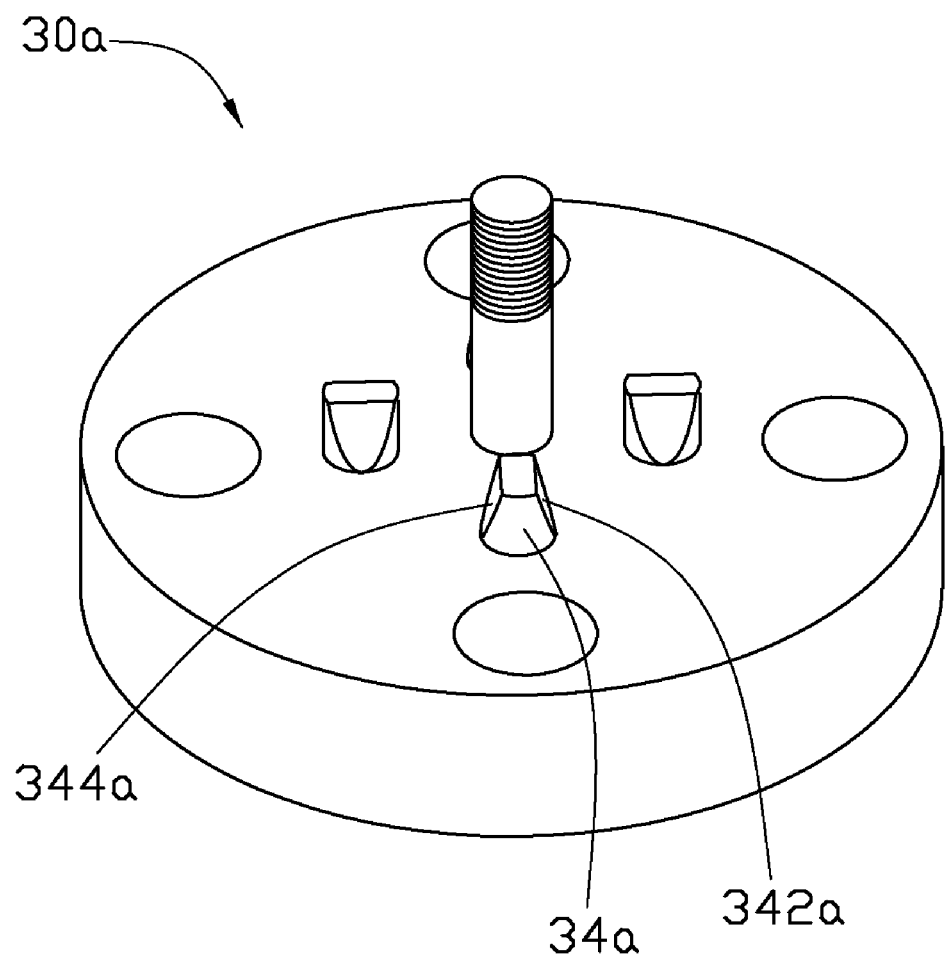
FIG. 6 is an isometric view of a lens holder in accordance with a second embodiment of a camera module.

Referring to FIG. 6, a lens holder 30a in accordance with a second embodiment of a camera module is shown. Unlike with the lens holder 30 of the first embodiment, each of protrusions 34a has two bevels 342a, 344a. The two bevels 342a, 344a are symmetrically opposite to each other. Thus, the lens holder 30a can be rotated in both clockwise and counterclockwise directions.

Figure 7:
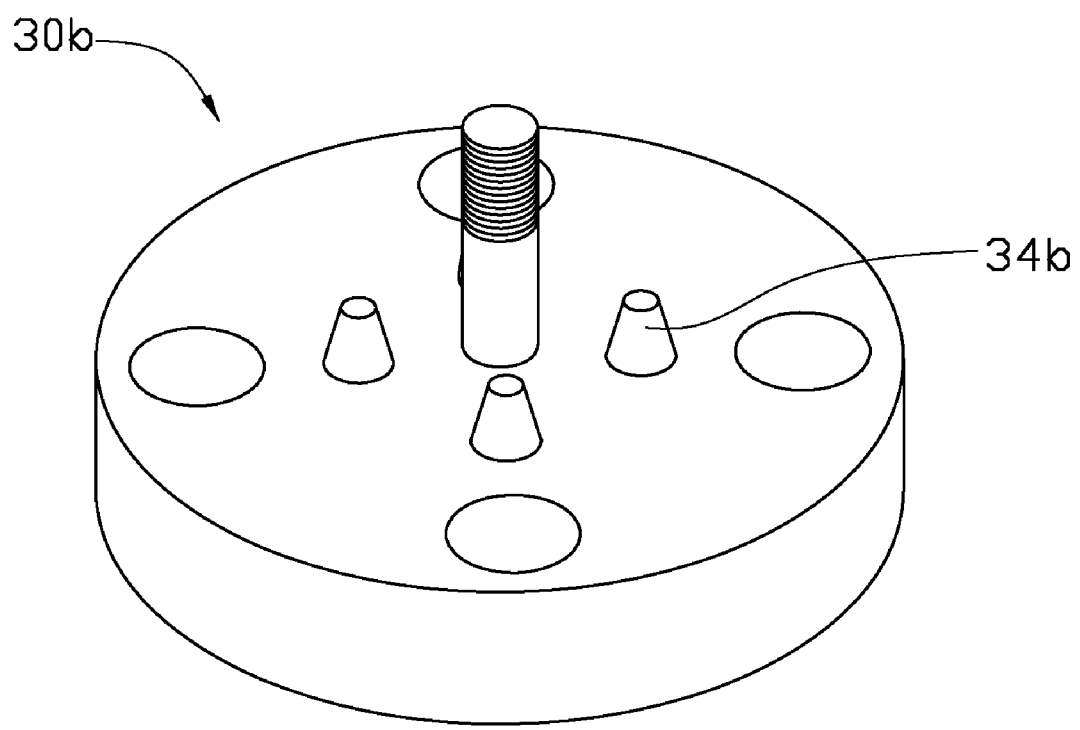
FIG. 7 is an isometric view of a lens holder in accordance with a third embodiment of a camera module.

Referring to FIG. 7, a lens holder 30b in accordance with a third embodiment of a camera module is shown. Unlike with the lens holder 30 of the first embodiment, each of protrusions 34b is frusto-conical. In the illustrated embodiment, each protrusion 34b has a round (circular) frusto-conical shape. Thus, the lens holder 30a can be rotated in both clockwise and counterclockwise directions.

It is understood that the described embodiments are intended to illustrate rather than limit the invention. Variations may be made to the embodiments without departing from the spirit of the invention. Accordingly, it is appropriate that the appended claims be construed broadly and in a manner consistent with the scope of the invention.

The invention claimed is:

1. A camera module, comprising:
a printed circuit board;
an image sensor and a spacer both mounted on the printed circuit board;
a plurality of fasteners, the printed circuit board comprising a plurality of first through holes, the spacer comprising a plurality of threaded holes, the fasteners extending through the respective first through holes and engaging in the respective threaded holes;
a lens holder arranged on and being rotatable relative to the spacer, the lens holder comprising a plurality of spaced lens receiving through holes each receiving at least one lens therein, each of the lens receiving through holes together with the at least one lens being capable of aligning with the image sensor by rotation of the lens holder; and
a retainer, the printed circuit board further comprising a second through hole, the spacer further comprising a third through hole, the lens holder further comprising a shaft comprising threads thereon, with the shaft extending through the third and second through holes and engaging the retainer.

2. The camera module of claim 1, wherein the plurality of spaced lens receiving through holes are arranged along an imaginary ring, and are in radial symmetry about a center of the lens holder.

3. The camera module of claim 1, wherein the spacer comprises a plurality of positioning holes, the lens holder further comprising a plurality of sockets each receiving a resilient positioning member, and the resilient positioning member capable of selectably and removably engaging in any one of the positioning holes.

4. The camera module of claim 3, wherein the resilient positioning member comprises a spring mounted to a wall of the socket and a protrusion connected to the spring, the protrusion tapered from an end thereof which is adjacent to the spring toward an opposite free end thereof.

5. The camera module of claim 4, wherein when the protrusions are engaged in the positioning holes, the lens holder is capable of driving the protrusions to slidingly exit the positioning holes by rotation of the lens holder.

6. The camera module of claim 4, wherein the protrusion has at least one bevel formed thereon such that the protrusion is tapered.

7. The camera module of claim 4, wherein the protrusion is in a frusto-conical shape such that the protrusion is tapered.

8. The camera module of claim 1, wherein the lens holder is disk-shaped.

9. A camera module, comprising:
a printed circuit board;
an image sensor and a spacer both mounted on the printed circuit board, the spacer spaced apart from the image sensor;
a lens holder rotatably engaged with the spacer, the lens holder comprising a plurality of spaced lens receiving through holes each receiving at least one lens therein, the lens receiving through holes being arranged along an imaginary ring, wherein a selected one of the lens receiving through holes is capable of aligning with the image sensor when the lens holder is rotated; and
a retainer, the printed circuit board further comprising a second through hole, the spacer further comprising a third through hole, the lens holder further comprising a shaft comprising threads thereon, with the shaft extending through the third and second through holes and engaging the retainer.

10. The camera module of claim 9, further comprising a plurality of fasteners, the printed circuit board comprising a plurality of first through holes, the spacer comprising a plurality of threaded holes, the fasteners extending through the respective first through holes and engaging in the respective threaded holes.

11. The camera module of claim 9, wherein the spacer comprises a plurality of positioning holes, the lens holder further comprising a plurality of sockets each receiving a resilient positioning member, and the resilient positioning member capable of selectably and removably engaging in any one of the positioning holes.

12. The camera module of claim 11, wherein the resilient positioning member comprises a spring mounted to a wall of the socket and a protrusion connected to the spring, the protrusion tapered from an end thereof which is adjacent to the spring toward an opposite free end thereof.

13. The camera module of claim 12, wherein when the protrusions are engaged in the positioning holes, the lens holder is capable of driving the protrusions to slidingly exit the positioning holes by rotation of the lens holder.

14. The camera module of claim 12, wherein the protrusion has at least one bevel formed thereon such that the protrusion is tapered.

15. The camera module of claim 12, wherein the protrusion is in a frusto-conical shape such that the protrusion is tapered.

16. The camera module of claim 9, wherein the lens holder is disk-shaped.

* * * * *